(12) United States Patent
Matsunaga

(10) Patent No.: US 9,500,155 B2
(45) Date of Patent: Nov. 22, 2016

(54) VEHICLE CONTROLLER

(75) Inventor: Masaki Matsunaga, Ashigarakami-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 612 days.

(21) Appl. No.: 13/820,572

(22) PCT Filed: Sep. 27, 2011

(86) PCT No.: PCT/IB2011/002240
§ 371 (c)(1),
(2), (4) Date: Mar. 4, 2013

(87) PCT Pub. No.: WO2012/042341
PCT Pub. Date: Apr. 5, 2012

(65) Prior Publication Data
US 2013/0179053 A1    Jul. 11, 2013

(30) Foreign Application Priority Data

Sep. 30, 2010 (JP) ................................. 2010-221947

(51) Int. Cl.
*F02D 45/00* (2006.01)
*B60W 10/02* (2006.01)
(Continued)

(52) U.S. Cl.
CPC ............... *F02D 45/00* (2013.01); *B60T 7/042* (2013.01); *B60T 7/12* (2013.01); *B60T 13/662* (2013.01);
(Continued)

(58) Field of Classification Search
CPC ........ F02D 29/02; F02D 45/00; F02D 13/04; F02D 2011/102; F02D 2200/0406; F02N 11/084; F02N 2200/0807; B60W 30/18018; B60W 10/06; B60W 2510/0671; B60W 2510/18; B60W 10/02; B60W 30/18109; B60W 10/188; B60W 2510/0604; B60W 2530/10; B60W 2030/1809; B60W 2540/10; Y02T 10/48; Y02T 10/46; B60T 7/042; B60T 13/662; B60T 7/12
USPC .................. 701/22, 54, 105, 107, 112–115; 123/179.3, 179.4; 903/902, 903, 930; 180/65.265, 65.28, 65.22, 65.285, 180/65.27
See application file for complete search history.

(56) References Cited

U.S. PATENT DOCUMENTS 6,131,063 A * 10/2000 Seki et al. ....................... 701/70
6,299,263 B1 * 10/2001 Uematsu et al. ............. 303/192
(Continued)

FOREIGN PATENT DOCUMENTS

DE    10 2004 024 212 A1    12/2005
EP        1 270 308 A2     1/2003
(Continued)

OTHER PUBLICATIONS

Mueller et al., "Next Generation Engine Start/Stop Systems: "Free-Wheeling"," *SAE International*, Apr. 12, 2011.

*Primary Examiner* — Joseph Dallo
(74) *Attorney, Agent, or Firm* — Oliff PLC

(57) ABSTRACT

A vehicle controller includes an engine, a hydraulic brake device that applies a brake force to a vehicle in response to operation of a driver, and a brake booster that assists the braking operation of the driver by a negative pressure generated by drive of the engine. An ECU can automatically stop the engine according to a running state of the vehicle, can automatically start the engine when the negative pressure of the brake booster decreases below the predetermined negative pressure determination value, which has been set in advance, when the engine is in the automatic stop state, and can change the negative pressure determination value according to kinetic energy of the vehicle running in the automatic stop state of the engine.

9 Claims, 3 Drawing Sheets

(51) Int. Cl.

| | | |
|---|---|---|
| *B60W 10/06* | (2006.01) | |
| *F02N 11/08* | (2006.01) | |
| *B60W 10/188* | (2012.01) | |
| *B60T 7/04* | (2006.01) | |
| *B60T 7/12* | (2006.01) | |
| *B60T 13/66* | (2006.01) | |
| *B60W 30/18* | (2012.01) | |

(52) U.S. Cl.
CPC .............. *B60W 10/02* (2013.01); *B60W 10/06* (2013.01); *B60W 10/188* (2013.01); *B60W 30/18109* (2013.01); *F02N 11/084* (2013.01); *B60W 2030/1809* (2013.01); *B60W 2510/0604* (2013.01); *B60W 2520/10* (2013.01); *B60W 2530/10* (2013.01); *B60W 2540/10* (2013.01); *B60W 2540/12* (2013.01); *B60W 2540/16* (2013.01); *F02N 2200/0801* (2013.01); *F02N 2200/0807* (2013.01); *Y02T 10/48* (2013.01)

(56) References Cited

U.S. PATENT DOCUMENTS

| | | | | |
|---|---|---|---|---|
| 6,334,834 | B1* | 1/2002 | Mizutani et al. | 477/203 |
| 8,000,861 | B2* | 8/2011 | Yasui et al. | 701/48 |
| 8,046,138 | B2* | 10/2011 | Yasui et al. | 701/48 |
| 2001/0025220 | A1* | 9/2001 | Kaneko et al. | 701/112 |
| 2002/0029943 | A1* | 3/2002 | Totsuka et al. | 188/113 |
| 2003/0004635 | A1* | 1/2003 | Kamiya et al. | 701/112 |
| 2003/0022755 | A1* | 1/2003 | Mizutani | 477/107 |
| 2004/0147364 | A1 | 7/2004 | Wakashiro et al. | |
| 2005/0057096 | A1* | 3/2005 | Kudo | 303/155 |
| 2005/0229890 | A1* | 10/2005 | Ichimoto et al. | 123/179.4 |
| 2006/0267401 | A1* | 11/2006 | Nishio et al. | 303/11 |
| 2007/0114841 | A1* | 5/2007 | Maruyama et al. | 303/89 |
| 2008/0023273 | A1* | 1/2008 | Toelge et al. | 188/1.11 E |
| 2008/0051966 | A1 | 2/2008 | Bouchard | |
| 2008/0243324 | A1* | 10/2008 | Harris | 701/22 |
| 2008/0255732 | A1* | 10/2008 | Yasui et al. | 701/48 |
| 2010/0094512 | A1* | 4/2010 | Corniglion et al. | 701/48 |
| 2010/0312460 | A1* | 12/2010 | Yamaguchi | 701/112 |
| 2011/0198165 | A1* | 8/2011 | Yasui et al. | 188/151 R |

FOREIGN PATENT DOCUMENTS

| | | | | |
|---|---|---|---|---|
| GB | 2 413 999 A | * | 11/2005 | |
| JP | 2001012272 A | * | 1/2001 | ............ F02D 29/02 |
| JP | 2002364419 A | | 12/2002 | |
| JP | A-2003-13768 | | 1/2003 | |
| JP | A-2004-204724 | | 7/2004 | |
| JP | A-2006-057513 | | 3/2006 | |
| JP | A-2006-83830 | | 3/2006 | |
| JP | A-2006-200370 | | 8/2006 | |
| JP | 2008102121 A | | 5/2008 | |

* cited by examiner

VEHICLE CONTROLLER

BACKGROUND OF THE INVENTION

1. Field of the Invention

The invention relates to a vehicle controller.

2. Description of Related Art

A variety of vehicle controllers have been suggested that automatically stop the engine and enable the economic running operation under predetermined operation conditions of the vehicle. In the economic running operation, the supply of fuel is stopped and therefore fuel consumption can be reduced.

An engine controller according to the related art that enables such economic running operation is described, for example, in Japanese Patent Application Publication No. 2006-200370 (JP-A-2006-200370). The engine automatic stop/start controller described in JP-A-2006-200370 can automatically start the engine when the negative pressure value of a brake booster using the intake negative pressure of the engine as a negative pressure source decreases in the automatic stop state of the engine, and increases the revolution speed and automatically starts the engine when the predetermined condition is fulfilled. More specifically, when the driver has tried to brake abruptly or has operated abruptly the steering wheel, and when the road has changed from a flat road to a sloped road, the revolution speed is increased and the engine is automatically started.

When a brake booster to which the intake negative pressure of the engine is supplied is installed on a vehicle, where the engine is stopped and the vehicle runs in the economic running mode, the negative pressure of the brake booster decreases. Accordingly, after the engine has been restarted, the brake operation performed by the driver cannot be sufficiently assisted by the brake booster and a feeling of uneasiness can be created. In the engine automatic stop/start device according to the above-described related art, when a brake operation is performed such that a large booster negative pressure is consumed in the stopping state of the engine, that is, when an abrupt brake operation is performed, abrupt steering operation is performed, or the vehicle runs on a sloped road, the determination value of engine automatic start is changed, the revolution speed is raised, the engine is automatically started, and the booster negative pressure is rapidly restored.

In the engine automatic stop/start device according to the above-described related art, when the engine is stopped and the vehicle runs in the economic running mode, sufficient negative pressure control of the brake booster is enabled when the driver performs a variety of operations. However, where the vehicle reaches a sloped road and the vehicle speed rises, the driver applies a large brake force or performs pumping braking. Where the booster negative pressure is not sufficient in such cases, the driver's braking operation cannot be sufficiently assisted. Further, in the engine automatic stop/start device according to the above-described related art, although the booster negative pressure is controlled when the vehicle runs on a sloped road, the sloped road should be defined, that is, the gradient angle of the road surface should be set and the control becomes difficult.

SUMMARY OF THE INVENTION

The invention provides a vehicle controller that improves running safety and also improves drivability by effectively performing negative pressure control for braking, regardless of the vehicle running state.

The vehicle controller according to the first aspect of the invention includes a drive source of a vehicle; a brake device that applies a brake force to the vehicle; a brake assist device that assists a braking operation of a driver by a negative pressure generated by drive of the drive source; automatic stop means for enabling automatic stop of the drive source according to a running state of the vehicle; automatic start means for automatically starting the drive source when a negative pressure of the brake assist device satisfies a predetermined condition in the automatic stop state of the drive device; and condition changing means for changing the condition according to kinetic energy of the vehicle running in the automatic stop state of the drive source.

In the abovementioned vehicle controller, the condition changing means may calculate the kinetic energy on the basis of the vehicle weight and speed.

In the abovementioned vehicle controller, the condition changing means may change the condition on the basis of an increment of the current kinetic energy of the vehicle with respect to the kinetic energy of the vehicle at the time the drive source is automatically stopped.

In the abovementioned vehicle controller, the condition changing means may change the condition according to a negative pressure necessary for decelerating or stopping the vehicle running in the automatic stop state of the drive source.

The abovementioned vehicle controller may further include brake operation amount detection means for detecting a brake operation amount applied by the driver when the vehicle runs after the drive engine has been automatically stopped, wherein the condition changing means changes the condition according to the brake operation amount detected by the brake operation amount detection means.

The vehicle controller according to the second aspect of the invention includes a drive source of a vehicle; a brake device that applies a brake force to the vehicle; a brake assist device that assists a braking operation performed by a driver by a negative pressure generated by drive of the drive source; automatic stop means that can automatically stop the drive source according to a running state of the vehicle; automatic start means for automatically starting the drive source when a negative pressure of the brake assist device satisfies a predetermined condition in the automatic stop state of the drive device; and condition changing means for changing the condition according to a brake force necessary for maintaining a speed of the vehicle running in the automatic stop state of the drive source.

The vehicle controller according to the first aspect of the invention is configured so that the drive source can be automatically started when the negative pressure for braking in the automatic stop state of the drive source satisfies the predetermined condition and this condition can be changed according to the kinetic energy of the vehicle running in the automatic stop state of the drive source. The resultant effect is that the brake negative pressure can be effectively controlled, regardless of the running state of the vehicle, thereby making it possible to improve running safety and also improve drivability.

The vehicle controller according to the second aspect of the invention is configured so that the drive source can be automatically started when the negative pressure for braking in the automatic stop state of the drive source satisfies the predetermined condition and this condition can be changed according to the brake force necessary to maintain the speed of the vehicle running in the automatic stop state of the drive source. The resultant effect is that the negative pressure for braking can be effectively controlled, regardless of the running state of the vehicle, thereby making it possible to improve running safety and also improve drivability.

BRIEF DESCRIPTION OF THE DRAWINGS

Features, advantages, and technical and industrial significance of example embodiments of the invention will be described below with reference to the accompanying drawings, in which like numerals denote like elements, and wherein.

DETAILED DESCRIPTION OF EMBODIMENTS

Embodiments of the vehicle controller in accordance with the invention will be described below in greater detail with reference to the drawings. However, the invention is not limited to the embodiments. Further, when there is a plurality of embodiments, the invention also includes the configurations obtained by combining the embodiments.

Figure 1:
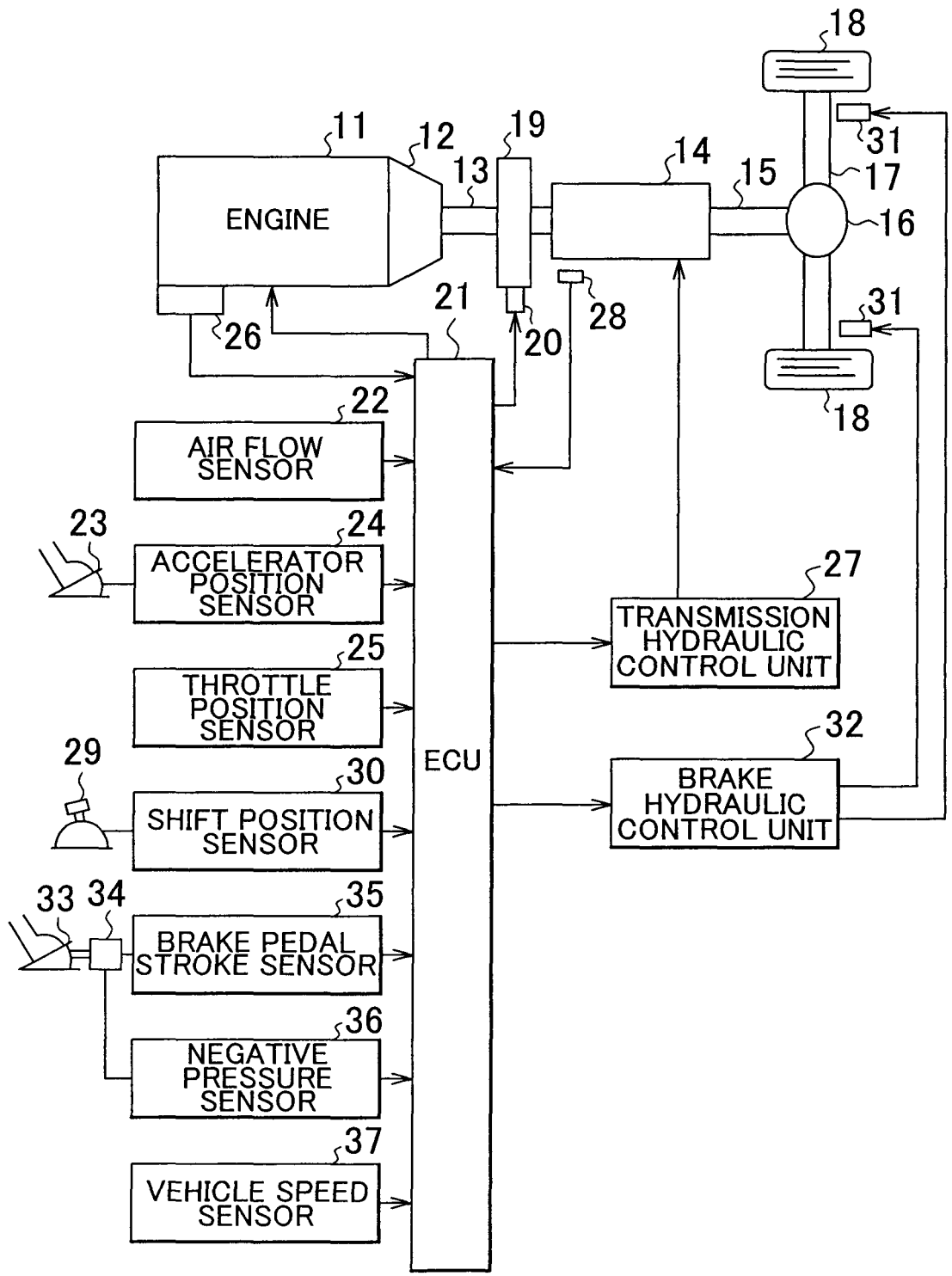
FIG. 1 is a block diagram illustrating the vehicle controller according to an embodiment of the invention.
Figure 2:
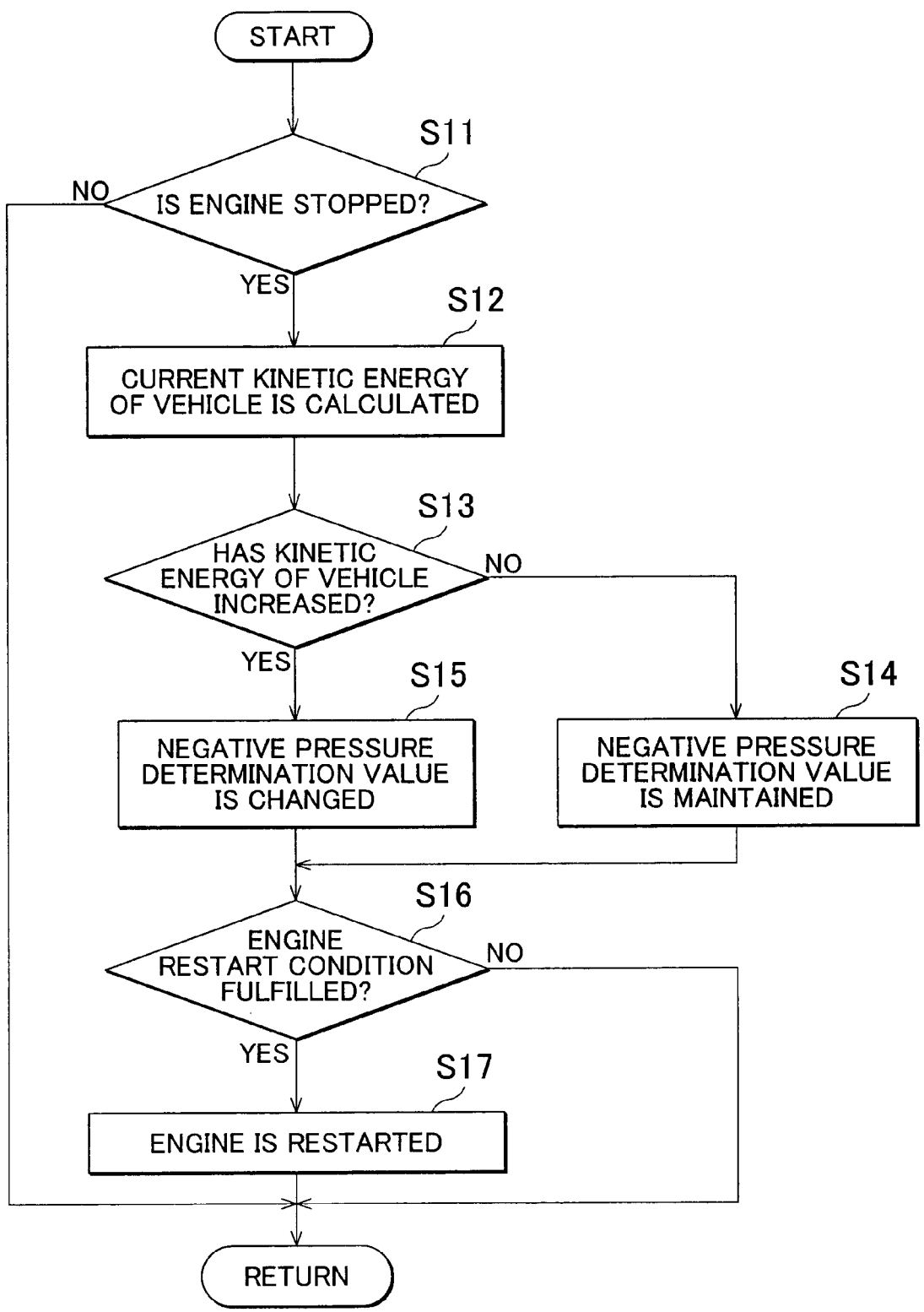
FIG. 2 is a flowchart illustrating the processing flow of engine restart control performed with the vehicle controller of the embodiment.
Figure 3:
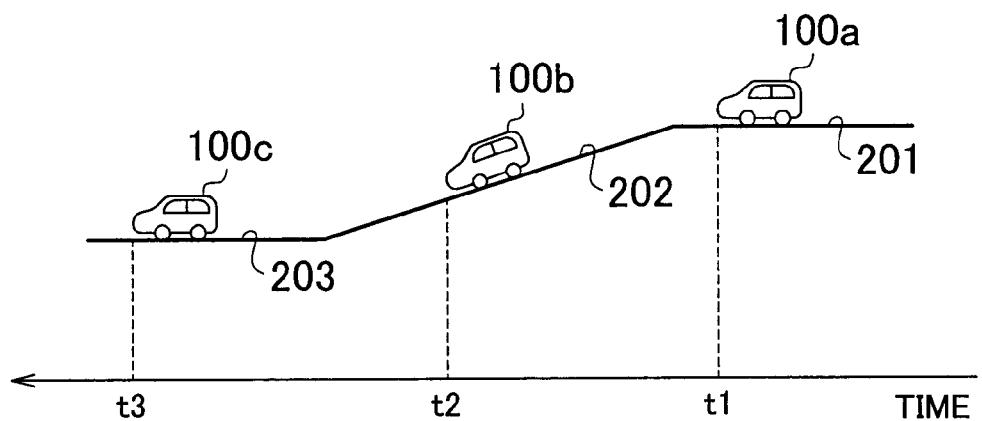
FIG. 3 is a schematic diagram illustrating variations in the running state of the vehicle.
Figure 4:
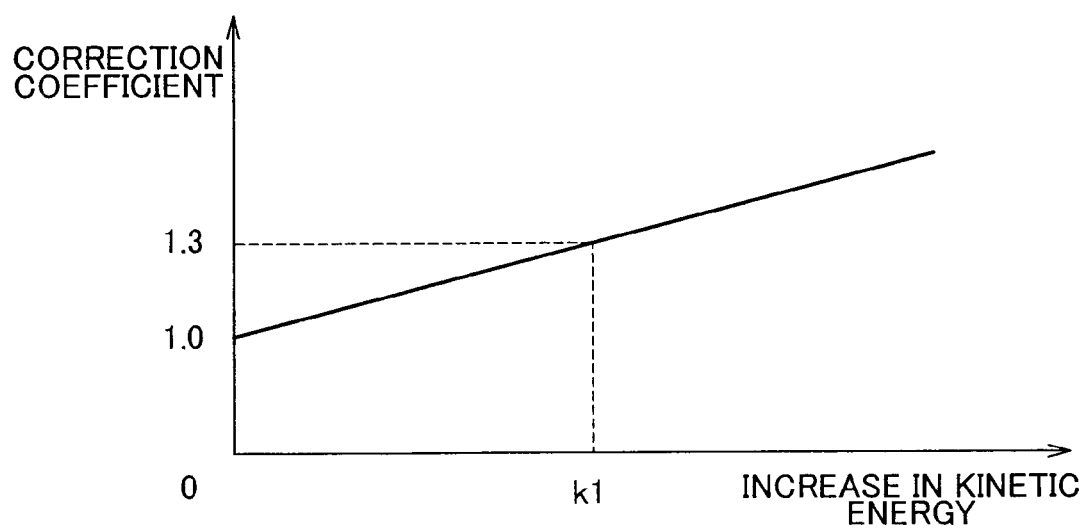
FIG. 4 is a graph illustrating the correction coefficient of a negative pressure determination value with respect to the increase in kinetic energy.

FIG. 1 is a block diagram illustrating the vehicle controller according to an embodiment of the invention. FIG. 2 is a flowchart illustrating the processing flow of engine restart control performed with the vehicle controller of the embodiment. FIG. 3 is a schematic diagram illustrating variations in the running state of the vehicle. FIG. 4 is a graph illustrating the correction coefficient of a negative pressure determination value with respect to the increase in kinetic energy.

In the vehicle controller of the embodiment, as shown in FIG. 1, in an engine 11 serving as a power source, a torque converter 12 is connected to a crankshaft, and a multispeed automatic transmission 14 is connected to a drive shaft 13 of the torque converter 12. A propeller shaft 15 is connected to the automatic transmission 14, and left and right drive shafts 17 are connected by a differential gear 16 to the propeller shaft 15. Left and right drive wheels 18 are connected to the drive shafts 17.

Therefore, when the engine 11 operates, the drive power thereof is outputted from the crankshaft, inputted to an input shaft of the automatic transmission 14 via the torque converter 12, and reduced at a predetermined speed ratio. The drive power after the reduction is outputted from an output shaft of the automatic transmission 14 to the propeller shaft 15 and transmitted from the propeller shaft 15 to the left and right drive shaft 17 by the differential gear 16 and can rotate the left and right drive wheels 18.

A clutch 19 is introduced between the torque converter 12 and the automatic transmission 14. The clutch 19 has an actuator 20, and the transmission of drive power and brake force between the engine 11 side and the drive wheel 18 side can be disabled by the actuator 20.

An engine control unit (ECU) 21 is installed on the vehicle, and the ECU 21 can control the drive of the engine 11. Thus, there are provided an air flow sensor 22 that measures an intake air amount, an accelerator position sensor 24 that detects a step-on amount (accelerator operation amount) of an accelerator pedal 23, a throttle position sensor 25 that detects a throttle opening degree in an electronic throttle device, and an engine revolution speed sensor 26 that detects a revolution speed of the engine 11. The ECU 21 controls a fuel injection amount from injectors, a fuel injection timing, an ignition period for sparkplugs, and the like on the basis of detection results obtained by the sensors 22, 24, 25, and 26.

Further, the automatic transmission 14 is hydraulically controlled by a transmission hydraulic control unit 27. The ECU 21 controls the transmission hydraulic control unit 27 to control hydraulically the automatic transmission 14, thereby enabling speed change control. Thus, there are provided an input shaft revolution speed sensor 28 that detects an input shaft revolution speed and a shift position sensor 30 that detects a shift position controlled by a shift lever device 29 operated by the driver. The ECU 21 controls the transmission hydraulic control unit 27 and controls hydraulically the automatic transmission 14 on the basis of detection results obtained by the sensors 24, 28, and 30, thereby controlling the speed change timing. In this case, the ECU 21 controls the drive power of the vehicle by controlling the engine 11 and the automatic transmission 14.

In the vehicle, a hydraulic brake device (brake device) 31 is provided for each drive wheel 18. The ECU 21 can control braking by controlling a brake hydraulic control unit 32 and hydraulically controlling the hydraulic brake device 31. In this case, a brake pedal 33 is connected to a brake booster (brake force increasing device) 34. The brake booster 34 is actuated by a supplied negative pressure and assists the driver's brake operation by using the negative pressure. The brake booster 34 has a negative pressure chamber (not shown in the figure) connected to an intake pipe of the engine 11, and a predetermined negative pressure of the negative pressure chamber is accumulated therein. Further, there are provided a brake pedal stroke sensor 35 that detects a step-on amount (brake pedal stroke) of the brake pedal 33, and a negative pressure sensor 36 that detects a negative pressure acting upon the negative pressure chamber of the brake booster 34. The ECU 21 controls the brake hydraulic control unit 32 on the basis of the detection result obtained by the brake pedal stroke sensor 35 and hydraulically controls the hydraulic brake device 31, thereby applying the predetermined brake force (brake hydraulic force) to the drive wheels 18.

In the embodiment, the engine (internal combustion engine) 11 is used as a drive source of the vehicle, the hydraulic brake device 31 is used as a brake device that applies a brake force to the vehicle in response to the driver's operation, and the brake booster 34 is used as a brake assist device that assists the driver's brake operation with the negative pressure generated by the drive of the drive source. The ECU 21 can automatically stop and also automatically start the engine 11 in response to the vehicle operation state. In this case, the ECU 21 functions as automatic stop means and automatic start means.

More specifically, the ECU 21 automatically stops the engine 11 when an engine automatic stop condition (for example, the driver has not stepped on the accelerator pedal 23 for a predetermined time) is fulfilled as the vehicle runs. Further, the ECU 21 automatically starts the engine 11 when an engine automatic start condition (for example, the driver steps on the accelerator pedal 23) is fulfilled as the vehicle travels with the automatically stopped engine 11. When the ECU 21 automatically stops the engine 11, the supply of fuel to the engine 11 and ignition are stopped and the clutch 19 is disengaged. With such execution of the inertia run (free run) mode in which the engine 11 is automatically stopped and the vehicle runs by inertia (inertia force) and the operation of stopping the inertia run by which the engine 11 is automatically started from the inertia run mode and the engine-driven state of the vehicle is restored, actual fuel consumption can be improved by stopping the engine 11 and causing the vehicle to run by inertia when the drive power is not required as the vehicle runs.

Further, the ECU 21 automatically starts the engine 11 when the negative pressure acting upon the negative pressure chamber of the brake booster 34 decreases below a predetermined negative pressure determination value (condition), which has been set in advance, in the automatic stop state of the engine 11. Where the driver steps several times on the brake pedal 33 when the engine 11 is stopped and the vehicle is in the free run mode, the negative pressure of the negative pressure chamber of the brake booster 34 decreases. This is because in this case the engine 11 has been stopped and therefore the negative pressure does not act upon the negative pressure chamber from the intake pipe of the engine 11. As a result, where the negative pressure of the negative pressure chamber of the brake booster 34 decreases, it is possible that the brake booster 34 will be unable to assist the driver's brake operation by the negative pressure. Accordingly, when the negative pressure of the negative pressure chamber of the brake booster 34 decreases below the negative pressure determination value in the automatic stop state of the engine 11, the ECU 21 automatically starts the engine 11 and ensures the predetermined negative pressure in the negative pressure chamber.

In the embodiment, the ECU 21 changes the negative pressure determination value (condition) according to kinetic energy of the vehicle running in the automatic stop state of the engine 11. The ECU 21 thus acts as condition changing means. The ECU 21 calculates the kinetic energy on the basis of weight and speed of the vehicle. A vehicle speed sensor 37 is provided for detecting the running speed of the vehicle, and the ECU 21 calculates the kinetic energy of the vehicle on the basis of the vehicle weight obtained by adding the weight of occupants to the vehicle weight and the vehicle speed detected by the vehicle speed sensor 37.

The ECU 21 changes the negative pressure determination value on the basis of an increment of the current kinetic energy of the vehicle with respect to the kinetic energy of the vehicle at the time the engine 11 has been automatically stopped. The ECU 21 changes the negative pressure determination value according to a negative pressure necessary for decelerating or stopping the vehicle running in the automatic stop state of the engine 11.

Further, the brake pedal stroke sensor 35 is used as brake operation amount detection means for detecting an amount of brake operation performed by the driver when the vehicle runs after the engine has been automatically stopped, and the ECU 21 changes the negative pressure determination value according to a brake operation amount detected by the brake pedal stroke sensor 35, more specifically an integral value of the number of brake operations performed by the driver or an integral value of brake pedal strokes.

Thus, once the engine automatic stop condition is fulfilled as the vehicle runs. The ECU automatically stops the engine 11 and the vehicle runs by inertia. In this case, when the road where the vehicle travels is sloped, since the engine 11 has been stopped the engine brake does not act upon the vehicle and the vehicle speed rises. Accordingly, the driver strongly steps on the brake pedal 33 or steps multiple times so as to pump the brake pedal 33 in order to reduce the vehicle speed. In this case, the braking operation or and operation of stepping on the brake pedal 33 performed by the driver surpasses that performed under usual circumstances and therefore the brake booster 34 requires a high negative pressure.

However, as described hereinabove, when the vehicle runs by inertia, since the engine 11 has been stopped, the negative pressure cannot be supplied to the negative pressure chamber of the brake booster 34 and the negative pressure conversely decreases. As a result, even when the vehicle speed rises as the vehicle running by inertia travels downhill, the brake booster 34 cannot sufficiently assist the driver's brake operation. Accordingly, the ECU 21 changes the negative pressure determination value to increase the negative pressure determination value according to the kinetic energy of the vehicle running in the automatic stop state of the engine 11, automatically starts the engine 11 earlier than usual and ensures a high negative pressure in the negative pressure chamber.

When the number of brake operations performed by the driver is increased in the vehicle that runs in the automatic stop state of the engine 11, the ECU 21 changes the negative pressure determination value to increase the negative pressure determination value according to the integral value of the number of brake operations or the integral value of brake pedal strokes, automatically starts the engine 11 earlier than usual and ensures a high negative pressure in the negative pressure chamber.

ECU 21 changes the negative pressure determination value to increase the negative pressure determination value according to the kinetic energy of the running vehicle in the automatic stop state of the engine 11, so as to change the negative pressure determination value according to the brake force necessary to maintain the current vehicle speed and so that the vehicle speed be constant.

The control performed by the vehicle controller of the embodiment will be described below in greater detail by using the flowchart shown in FIG. 2.

In the vehicle controller of the embodiment, as shown in FIG. 2, in step S11, the ECU 21 determines whether or not the engine 11 is in the automatic stop state in the running vehicle. Where the engine 11 is determined not to be in the automatic stop state, nothing is done and the routine is not performed. Where the engine 11 is determined to be in the automatic stop state, the current kinetic energy of the vehicle is calculated in step S12. In this case, the ECU 21 calculates the initial kinetic energy of the vehicle at the time the inertia run mode is started after the automatic stop of the engine 11 and stores the calculated initial kinetic energy. The ECU 21 calculates at all times the kinetic energy of the vehicle in the inertia run mode after the engine 11 has been stopped.

A method for calculating the kinetic energy of the vehicle will be explained below. Where the mass (weight) of the vehicle is denoted by m and the vehicle speed is denoted by v, the kinetic energy K of the vehicle can be determined by the following numerical formula. $K=(1/2)mv^2$. In this case, the mass (weight) m of the vehicle may be determined by finding the vehicle weight in advance and adding the total weight of the occupants thereto. The detection result obtained with the vehicle speed sensor 37 may be used as the vehicle speed v.

Then, in step S13, the ECU 21 determines whether the kinetic energy of the vehicle has increased. As shown in FIG. 3, where the engine 11 is automatically stopped and the vehicle runs by inertia in the process in which the vehicle 100a runs on a flat road 201, the initial kinetic energy at this time is calculated and stored. Where the vehicle 100b that runs by inertia starts thereafter running on a sloped road 202, the speed of the vehicle 100b rises and the kinetic energy increases. Thus, the increase k in kinetic energy can be determined by the following numerical formula. Here, v1 is the vehicle speed at the time the vehicle starts running by inertia, and v2 is the current vehicle speed, that is, the speed of the vehicle running on the sloped road. $k=(\frac{1}{2}) \times m \times (v2^2 - v1^2)$.

For example, where m is 1500 kg, v1 is 30 km/h (8.3 m/s), and v2 is 50 km/h (13.9 m/s), the increase k1 in kinetic energy at this time is as follows. $k1=(\frac{1}{2}) \times 1500 \times (13.9^2 - 8.3^2) = 93240$.

Returning to FIG. 2, where it is determined in step S13 that the kinetic energy of the vehicle has not increased, the processing flow advances to step S14 and the current negative pressure determination value is maintained. Where the kinetic energy of the vehicle is determined to have increased, the processing flow advances to step S15 and the negative pressure determination value is changed. In this case, as shown in FIG. 4, the ECU 21 stores in advance a graph (map) representing a correction coefficient of the negative pressure determination value with respect to the increase in kinetic energy and determines the correction coefficient on the basis of the calculated increase k (k1) in kinetic energy. This map demonstrates that where the increase k in kinetic energy is 0 (or equal to or less than 0), the correction coefficient is 1. Where the increase k1 in kinetic energy is 93240, as mentioned hereinabove, the correction coefficient is 1.3. Thus, in step S15, the ECU 21 sets a new negative pressure determination value (for example, 65 kPa) by calculating the correction coefficient 1.3 for the current negative pressure determination value (for example, 50 kPa).

Returning to FIG. 2, in step S16, the ECU 21 determines whether the automatic start condition (restart condition) of the engine 11 has been fulfilled. Where it is determined that the automatic start condition of the engine 11 has not been fulfilled, nothing is done and the routine is not performed. Where it is determined that the automatic start condition of the engine 11 has been fulfilled, the ECU 21 automatically starts (restarts) the engine 11 in step S17. Thus, the ECU 21 starts fuel supply to the engine 11 and ignition and engages the clutch 19.

In the embodiment, the negative pressure determination value is used as the automatic start condition for the engine 11, the ECU 21 determines whether or not the current negative pressure in the negative pressure chamber of the brake booster 34 that has been detected by the negative pressure sensor 36 is below the negative pressure determination value and automatically starts the engine 11 when the current negative pressure is determined to be below the negative pressure determination value. In this case, when the vehicle running by inertia reaches a sloped road, the negative pressure determination value is changed to increase. As a result, the engine 11 is automatically started earlier than in the case of running on a flat road, a high negative pressure is ensured for the negative pressure chamber of the brake booster 34, and the brake booster 34 can sufficiently assist the brake operation performed by the driver.

In this case, the ECU 21 may change the negative pressure determination value so as to increase the determination value according to the amount of brake operation performed by the driver when the vehicle runs by inertia after the engine 11 has been automatically stopped.

Thus, the vehicle controller of the embodiment includes the engine 11, the hydraulic brake device 31 that applies a brake force to the vehicle in response to the driver's operation, and the brake booster 34 that assists the braking operation performed by the driver by a negative pressure generated by drive of the engine 11. The ECU 21 can automatically stop the engine 11 according to the running state of the vehicle, can automatically start the engine 11 when a negative pressure of the brake booster 34 is below the predetermined negative pressure determination value, which has been set in advance, when the engine is in the automatic stop state, and can change the negative pressure determination value according to kinetic energy of the vehicle running in the automatic stop state of the engine 11.

Therefore, by changing the negative pressure determination value according to kinetic energy of the vehicle running in the automatic stop state of the engine 11, it is possible to maintain the negative pressure of the brake booster 34 at an optimum value according to the running state of the vehicle, and negative pressure control for braking is performed effectively, regardless of the running state of the vehicle, thereby making it possible to improve running safety and also enable effective brake assist with the brake booster 34 and improve drivability.

In the vehicle controller of the embodiment, the ECU 21 calculates the kinetic energy on the basis of vehicle weight and speed. Therefore, by calculating the kinetic energy on the basis of vehicle weight and speed, it is possible to determine the kinetic energy easily and with high accuracy and the increase in complexity level of the device can be inhibited.

More specifically, the ECU 21 changes the negative pressure determination value on the basis of an increment of the current kinetic energy of the vehicle with respect to the kinetic energy of the vehicle after the engine 11 has been automatically stopped. In this case, the negative pressure determination value is changed according to a negative pressure necessary for decelerating or stopping the vehicle running in the automatic stop state of the engine 11. Therefore, the negative pressure determination value is changed to increase on the basis of the increment in kinetic energy, and when the engine 11 is automatically stopped and the vehicle speed rises, the engine 11 can be easily automatically started and a sufficient brake assist force, that is, a brake force for decelerating or stopping the vehicle, can be ensured at all times.

Further, in the vehicle controller of the embodiment, when the engine 11 is automatically stopped and the vehicle runs by inertia, the ECU 21 increases the negative pressure determination value according to the amount of brake operation performed by the driver. Therefore, when the driver steps on the brake pedal 33 with a high frequency, the reduction degree of the negative pressure of the brake booster 34 is high. Therefore, by increasing the negative pressure determination value in this case, it is possible to start the engine 11 automatically in an easy manner and a sufficient brake assist force, that is, a brake force for decelerating or stopping the vehicle, can be ensured at all times.

Further, the vehicle controller of the embodiment includes the engine 11, the hydraulic brake device 31 that applies a brake force to the vehicle in response to the driver's operation, and the brake booster 34 that assists the braking operation performed by the driver by a negative pressure generated by drive of the engine 11. The ECU 21 can automatically stop the engine 11 according to the running state of the vehicle, can automatically start the engine 11 when a negative pressure of the brake booster 34 is below the predetermined negative pressure determination value, which has been set in advance, when the engine is in the automatic stop state, and can change the negative pressure determination value according to the brake force necessary for maintaining the speed of the vehicle running in the automatic stop state of the engine 11.

Therefore, by changing the negative pressure determination value according to the brake force necessary for maintaining the speed of the vehicle running in the automatic stop state of the engine 11, it is possible to maintain the negative pressure of the brake booster 34 at an optimum value according to the running state of the vehicle, and negative pressure control for braking is performed effectively, regardless of the running state of the vehicle, thereby making it possible to improve running safety and also enable effective brake assist with the brake booster 34 and improve drivability.

In the above-described embodiment, the torque converter 12 is connected to the engine 11, which serves as a power source, by the clutch 19, and the multistep automatic transmission 14 is connected to the torque converter 12, but such a configuration is not limiting. For example, a clutch and a manual transmission may be used instead of the clutch 19, torque converter 12, and automatic transmission 14, and a continuously variable transmission (CVT) or a dual clutch transmission (DCT) may be used instead of the multistep automatic transmission 14. Further, in the embodiment, the brake device is the hydraulic brake device 31 that is actuated by the driver operating the brake pedal 33, but an automatic brake device may be also used such that the hydraulic brake device 31 is actuated by the ECU 21 according to the running state of the vehicle.

As described hereinabove, the vehicle controller in accordance with the invention changes the condition for automatically starting the drive source according to kinetic energy of the vehicle travelling in the automatic stop state of the drive source. As a result, pressure control for braking can be effectively performed, regardless of the running state of the vehicle, thereby improving running safety and also improving drivability. Thus, the vehicle controller in accordance with the invention is useful for vehicle running control devices.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. A vehicle controller comprising:
a drive source of a vehicle;
a brake device that applies a brake force to the vehicle;
a brake assist device that assists a braking operation of a driver by a negative pressure generated by drive of the drive source; and
an electronic control unit having control logic configured to cause the electronic control unit to:
enable automatic stop of the drive source according to a running state of the vehicle;
automatically start the drive source when a negative pressure of the brake assist device decreases below a negative pressure determination value in the automatic stop state of the drive source;
calculate kinetic energy of the vehicle based on a weight of the vehicle and a speed of the vehicle; and
increase the negative pressure determination value according to kinetic energy of the vehicle running in the automatic stop state of the drive source.

2. The vehicle controller according to claim 1, wherein the electronic control unit is further configured to increase the negative pressure determination value on the basis of an increment of the current kinetic energy of the vehicle with respect to the kinetic energy of the vehicle at the time the drive source is automatically stopped.

3. The vehicle controller according to claim 1, wherein the electronic control unit is further configured to increase the negative pressure determination value according to a negative pressure necessary for decelerating or stopping the vehicle running in the automatic stop state of the drive source.

4. The vehicle controller according to claim 1, further comprising a brake operation amount detector that detects brake operation amount applied by the driver when the vehicle runs after the drive source has been automatically stopped, wherein
the electronic control unit is further configured to increase the negative pressure determination value according to the brake operation amount detected by the brake operation amount detector.

5. A vehicle controller comprising:
a drive source of a vehicle;
a brake device that applies a brake force to the vehicle;
a brake assist device that assists a braking operation of a driver by a negative pressure generated by drive of the drive source; and
an electronic control unit having control logic configured to cause the electronic control unit to:
enable automatic stop of the drive source according to a running state of the vehicle;
automatically start the drive source when a negative pressure of the brake assist device decreases below a negative pressure determination value in the automatic stop state of the drive source; and
increase the negative pressure determination value according to a brake force necessary for maintaining a speed of the vehicle running in the automatic stop state of the drive source.

6. The vehicle controller according to claim 2, wherein the electronic control unit is further configured to increase the negative pressure determination value according to a negative pressure necessary for decelerating or stopping the vehicle running in the automatic stop state of the drive source.

7. The vehicle controller according to claim 2, further comprising a brake operation amount detector that detects brake operation amount applied by the driver when the vehicle runs after the drive source has been automatically stopped, wherein
the electronic control unit is further configured to increase the negative pressure determination value according to the brake operation amount detected by the brake operation amount detector.

8. The vehicle controller according to claim 3, further comprising a brake operation amount detector that detects brake operation amount applied by the driver when the vehicle runs after the drive source has been automatically stopped, wherein
the electronic control unit is further configured to increase the negative pressure determination value according to the brake operation amount detected by the brake operation amount detector.

9. The vehicle controller according to claim 6, further comprising a brake operation amount detector that detects brake operation amount applied by the driver when the vehicle runs after the drive source has been automatically stopped, wherein the electronic control unit is further configured to increase the negative pressure determination value according to the brake operation amount detected by the brake operation amount detector.

* * * * *